(12) United States Patent
Patterson et al.

(10) Patent No.: US 10,997,838 B2
(45) Date of Patent: May 4, 2021

(54) SYSTEMS AND METHODS FOR DEACTIVATION OF ACOUSTO-MAGNETIC ELECTRONIC ARTICLE SURVEILLANCE MARKERS

(71) Applicant: Sensormatic Electronics, LLC, Boca Raton, FL (US)

(72) Inventors: Hubert A. Patterson, Boca Raton, FL (US); Thomas Solaski, Boca Raton, FL (US); Ronald B. Easter, Parkland, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/297,865

(22) Filed: Mar. 11, 2019

(65) Prior Publication Data

US 2019/0287361 A1 Sep. 19, 2019

Related U.S. Application Data

(60) Provisional application No. 62/644,049, filed on Mar. 16, 2018.

(51) Int. Cl.
  *G08B 13/24* (2006.01)
  *G06K 7/10* (2006.01)
(52) U.S. Cl.
  CPC ..... *G08B 13/2425* (2013.01); *G06K 7/10158* (2013.01); *G08B 13/246* (2013.01); *G08B 13/2411* (2013.01)

(58) Field of Classification Search
  CPC .............. G08B 13/2425; G08B 13/246; G08B 13/2411; G06K 7/10158
  See application file for complete search history.

(56) References Cited

U.S. PATENT DOCUMENTS

| 2012/0032803 A1 | 2/2012 | Copeland et al. |
| 2014/0268472 A1 | 9/2014 | Easter et al. |
| 2018/0189770 A1* | 7/2018 | Vuille ................... H04B 1/385 |

FOREIGN PATENT DOCUMENTS

| EP | 2759975 a1 | 7/2014 |
| EP | 02759975 A1 | 7/2014 |
| WO | 2016191670 A1 | 12/2016 |
| WO | 2016201205 A1 | 12/2016 |

OTHER PUBLICATIONS

Partial International Search Report and Written Opinion dated Jul. 10, 2019 and prepared by the ISA for PCT/US2019/021529.

* cited by examiner

*Primary Examiner* — Daniell L Negron
(74) *Attorney, Agent, or Firm* — Arent Fox LLP

(57) ABSTRACT

Systems and methods for operating a marker. The methods comprise: storing energy collected by an energy harvesting element of the marker; using the stored energy to enable operations of the marker's communications element; receiving, by the marker's communications element, a marker deactivation signal transmitted from an external device; and causing either a resonator to be prevented from receiving transmit bursts emitted from an EAS system, a bias element's magnetic field to be normalized, or a resonator to be physically prevented from vibrating, in response to the marker deactivation signal's reception.

8 Claims, 16 Drawing Sheets

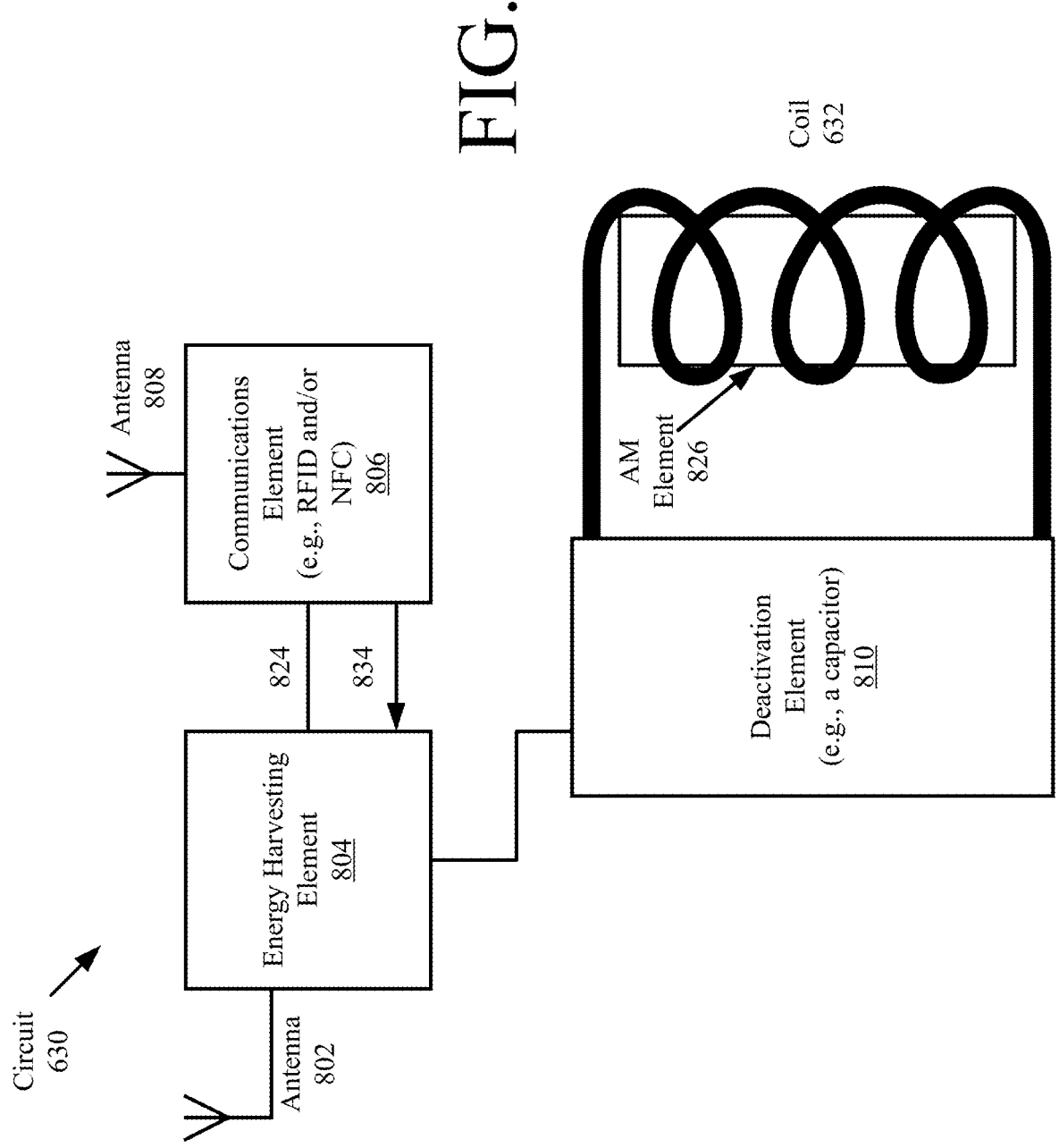

SYSTEMS AND METHODS FOR DEACTIVATION OF ACOUSTO-MAGNETIC ELECTRONIC ARTICLE SURVEILLANCE MARKERS

CROSS-REFERENCE TO RELATED APPLICATIONS

The present application claims priority to U.S. Provisional Patent Application Ser. No. 62/644,049 filed on Mar. 16, 2018. This U.S. Provisional Patent Application is incorporated herein by reference in its entirety.

FIELD

This document relates generally to Electronic Article Surveillance ("EAS") systems. More particularly, this document relates to systems and methods for deactivation of Acousto-Magnetic ("AM") EAS markers.

BACKGROUND

Self-checkout is required by retailers to reduce internal costs and to create a more seamless purchasing experience within a store environment. However, removing or deactivating EAS markers is not a customer friendly action and requires the customer to specifically complete the transaction at a defined store location containing the appropriate deactivation devices. No method currently exists that allows the customer to purchase an item and securely deactivate the EAS marker with a mobile phone.

SUMMARY

The present disclosure generally concerns systems and methods for operating a marker. The methods comprise: storing energy collected by an energy harvesting element of the marker; using the stored energy to enable operations of the marker's communications element; receiving, by the marker's communications element, a marker deactivation signal transmitted from an external device; and causing a resonator to be prevented from receiving transmit bursts emitted from an EAS system, a bias element's magnetic field to be normalized, and/or a resonator to be physically prevented from vibrating, in response to the marker deactivation signal's reception.

In some scenarios, the resonator is prevented from receiving transmit bursts emitted from an EAS system when a coil internal to the marker is shorted. The coil surrounds at least a resonator of the marker.

In those or other scenarios, the normalization of the bias element's magnetic field causes a state of a deactivation component disposed inside the marker's housing to change from a solid state to a liquid state. The state of the deactivation component returns to the solid state when normalization of the bias element's magnetic field is discontinued. The deactivation component can include, but is not limited to, a Ferrofluid or a Magnetorheological fluid.

In those or other scenarios, the bias element's magnetic field is normalized via generation of a deactivation magnetic field that opposes the bias element's magnetic field. The deactivation magnetic field is generated by a coil at least disposed around a resonator of the marker.

In those or other scenarios, a shape memory alloy component is used to physically prevent the resonator from vibrating. The shape memory alloy component changes shape when heat is applied thereto such that the resonator is mechanically pushed against a sidewall of an internal cavity of the marker. The heat can be applied to the shape memory alloy by a device external to the marker or by internal resistive heating of the wire itself when provided power.

In those or other scenarios, an electrophoretic component internal to the marker is used to normalize the bias element's magnetic field. The electrophoretic component comprises an electronic ink display. The bias element's magnetic field is normalized when all particles of the electronic ink display are aligned in the same direction.

DESCRIPTION OF THE DRAWINGS

The present solution will be described with reference to the following drawing figures, in which like numerals represent like items throughout the figure.

FIGS. 8A-8B (collectively referred to as "FIG. 8") provide a diagram of the circuit shown in FIG. 6.

DETAILED DESCRIPTION

Figure 1:
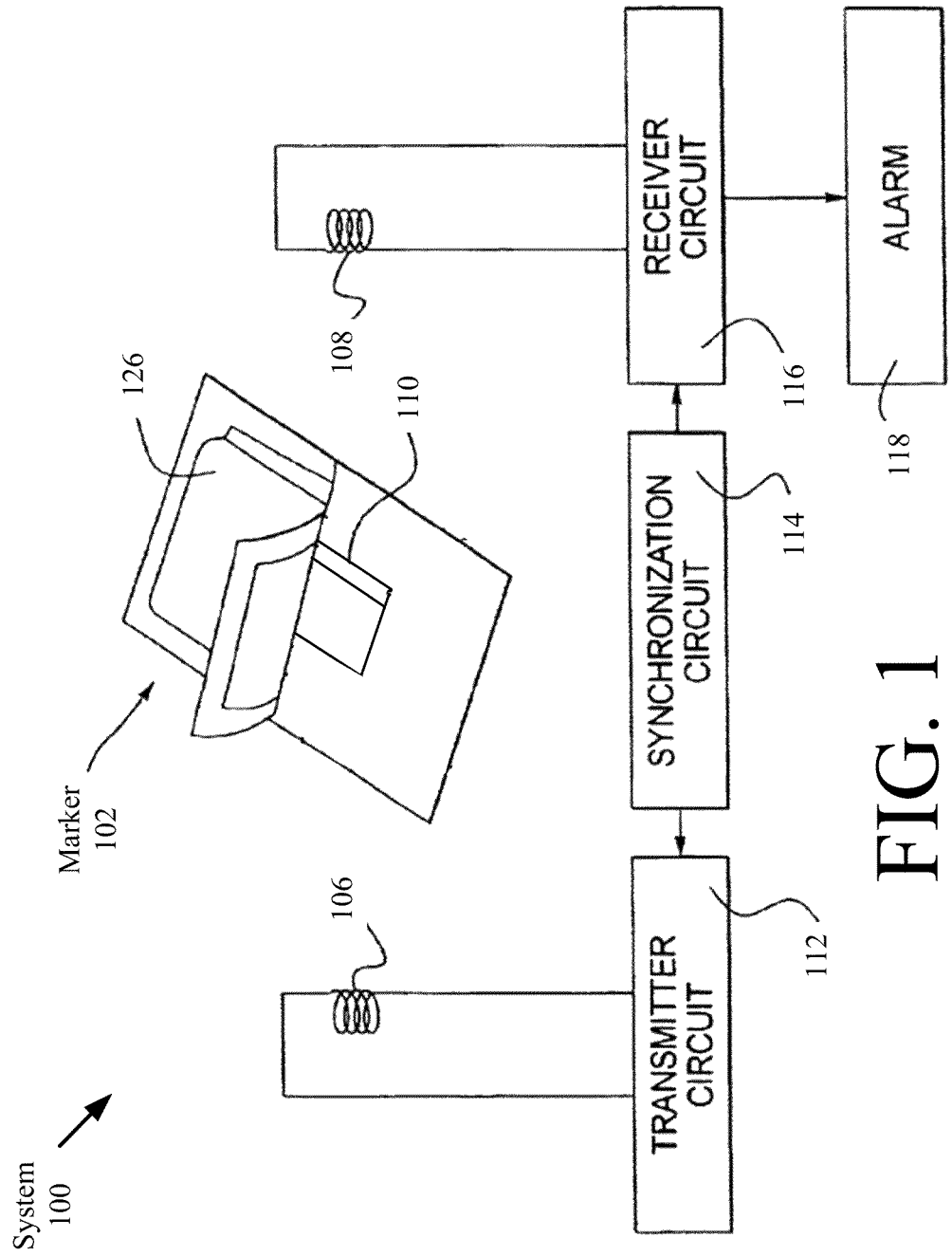
FIG. 1 is an illustration of an illustrative architecture for a EAS system comprising at least one marker.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The standard method for deactivating an AM EAS marker is to demagnetize an internal bias element with an Alternating Current ("AC") field that decays in strength. While this method is very successful, it uses a significant amount of energy to produce the decaying magnetic field. When a customer uses self-checkout, (s)he does not know how to properly use the deactivator and must be near the appropriate space at the checkout stand. This configuration is not compatible with the current move toward self-checkout using a cell phone as the checkout interface.

One proposed self-checkout method consists of the following steps: performing actions by a customer to select a piece of merchandise; performing operations by the customer's mobile phone to scan a Radio Frequency Identification ("RFID") or Near Field Communication ("NFC") tag embedded in the merchandise or a bar code coupled to the merchandise to obtain item identification information; performing operations by the customer's mobile phone to retrieve item related information (e.g., price) from a remote server of an enterprise system; initiating a purchase transaction in response to a user-software interaction received by the customer's mobile phone; and receiving a confirmation of the transaction at the customer's mobile phone.

At this point the item is purchased, but the EAS marker is still active. Generating the required magnetic field in the customer's mobile phone to demagnetize the bias element is not practical due to the large coil and current required to generate the appropriate magnetic field.

The following solutions described below require more energy from the customer's mobile phone than is generated by the typical NFC reader in a mobile phone. However, the EAS marker can be configured to harvest energy from RF energy emitted from the mobile phone for normal phone transmissions. The required energy is harvested by the EAS marker during the transmissions required to verify the purchase. Then the customer's mobile phone sends a signal to the RFID enabled device or NFC Integrated Circuit ("IC") in the EAS marker that causes the release of energy to initiate one of the following mechanisms.

This disclosure covers four EAS marker deactivation solutions suitable for self-checkout applications. A first solution employs a resonant circuit (e.g., a 13.56 MHz resonant circuit) with a capacitor that has the checkpoint failure mechanism built in. The EAS marker is deactivated via an NFC signal (e.g., a 13.56 MHz NFC signal) emitted from the customer's mobile phone located a relatively small distance from the EAS marker.

A second solution employs a Ferrofluid or a Magnetorheological fluid disposed in proximity to a bias element of an EAS marker. These types of fluids are liquids that become strongly magnetized in the presence of a magnetic field. In this regard, the Ferrofluid comprises nanoscale ferromagnetic particles (e.g., iron particles) suspended in a carrier fluid (e.g., an oil emulsion). The Magnetorheological fluid comprises particles primarily on the micro-meter scale. Each of these fluids has two states of matter, namely a solid state and a liquid state. The fluid's state of matter changes from the liquid state to the solid state with the application of a magnetic field. The rigidity of the fluid in its solid state depends on the strength of the magnetic field applied thereto. If the magnetic field's application is discontinued, then the fluid loses viscosity. Therefore, in order to deactivate the EAS marker, the bias element's magnetic field is neutralized via the generation of a deactivate magnetic field that momentarily opposes the bias element's magnetic field (e.g., a 6 Oe magnetic field). The fluid flows or migrates into a cavity above or below the EAS marker's resonator when the bias element's magnetic field is neutralized. The fluid once again stiffens when the deactivate magnetic field is no longer being generated. In effect, the EAS marker's resonator is mechanically prevented from exhibiting a resonant behavior (i.e., vibrating or oscillating) by the Ferrofluid or Magnetorheological fluid.

A third solution employs an elongate component (e.g., a wire or ribbon) formed of a shape memory alloy which changes shape with the application of heat thereto. The elongate component is disposed in the EAS marker above or below the resonator, and heated via a signal from the customer's mobile phone. When heated, the elongate component bends and mechanically pushes the EAS marker's resonator against a cavity wall whereby the resonator can no longer exhibiting a resonant behavior (i.e., vibrating or oscillating).

The fourth solution employs an electrophoretic material with particles that move relative to a fluid under the influence of a spatially uniform electric field. The particle movement: changes or normalizes the magnetic bias field required for the resonator to resonate at the EAS system's operating frequency (e.g., 58 KHz); or clamps the EAS marker's resonator.

Illustrative EAS System

Referring now to FIG. 1, there is provided a schematic illustration of an illustrative EAS system 100. The EAS system 100 comprises a monitoring system 106-112, 114-118 and at least one marker 102. The marker 102 may be attached to an article to be protected from unauthorized removal from a business facility (e.g., a retail store). The monitoring system comprises a transmitter circuit 112, a synchronization circuit 114, a receiver circuit 116 and an alarm 118.

During operation, the monitoring system 106-112, 114-118 establishes a surveillance zone in which the presence of the marker 102 can be detected. The surveillance zone is usually established at an access point for the controlled area (e.g., adjacent to a retail store entrance and/or exit). If an article enters the surveillance zone with an active marker 102, then an alarm may be triggered to indicate possible unauthorized removal thereof from the controlled area. In contrast, if an article is authorized for removal from the controlled area, then the marker 102 can be deactivated and/or detached therefrom. Consequently, the article can be carried through the surveillance zone without being detected by the monitoring system and/or without triggering the alarm 118.

The operations of the monitoring system will now be described in more detail. The transmitter circuit 112 is coupled to the antenna 106. The antenna 106 emits transmit (e.g., "Radio Frequency ("RF")") bursts at a predetermined frequency (e.g., 58 KHz) and a repetition rate (e.g., 50 Hz, 60 Hz, 75 Hz or 90 Hz), with a pause between successive bursts. In some scenarios, each transmit burst has a duration of about 1.6 ms. The transmitter circuit 112 is controlled to emit the aforementioned transmit bursts by the synchronization circuit 114, which also controls the receiver circuit 116. The receiver circuit 116 is coupled to the antenna 108. The antenna 106, 108 comprises close-coupled pick up coils of N turns (e.g., 100 turns), where N is any number.

When the marker 102 resides between the antennas 106, 108, the transmit bursts transmitted from the transmitter 112, 108 cause a signal to be generated by the marker 102. In this regard, the marker 102 comprises a stack 110 (e.g., a resonator and a bias element) disposed in a marker housing 126. The transmit bursts emitted from the transmitter 112, 108 drive the resonator to oscillate at a resonant frequency (e.g., 58 KHz). As a result, a signal is produced with an amplitude that decays exponentially over time.

The synchronization circuit 114 controls activation and deactivation of the receiver circuit 116. When the receiver circuit 116 is activated, it detects signals at the predetermined frequency (e.g., 58 KHz) within first and second detection windows. In the case that a transmit burst has a duration of about 1.6 ms, the first detection window will have a duration of about 1.7 ms which begins at approximately 0.4 ms after the end of the transmit burst. During the first detection window, the receiver circuit 116 integrates any signal at the predetermined frequency which is present. In order to produce an integration result in the first detection window which can be readily compared with the integrated signal from the second detection window, the signal emitted by the marker 102 should have a relatively high amplitude (e.g., greater than or equal to about 1.5 nanowebers (nWb)).

After signal detection in the first detection window, the synchronization circuit 114 deactivates the receiver circuit 116, and then re-activates the receiver circuit 116 during the second detection window which begins at approximately 6 ms after the end of the aforementioned transmit burst. During the second detection window, the receiver circuit 116 again looks for a signal having a suitable amplitude at the predetermined frequency (e.g., 58 kHz). Since it is known that a signal emanating from the marker 102 will have a decaying amplitude, the receiver circuit 116 compares the amplitude of any signal detected at the predetermined frequency during the second detection window with the amplitude of the signal detected during the first detection window. If the amplitude differential is consistent with that of an exponentially decaying signal, it is assumed that the signal did, in fact, emanate from a marker between antennas 106, 108. In this case, the receiver circuit 116 issues an alarm 118.

Figure 2:
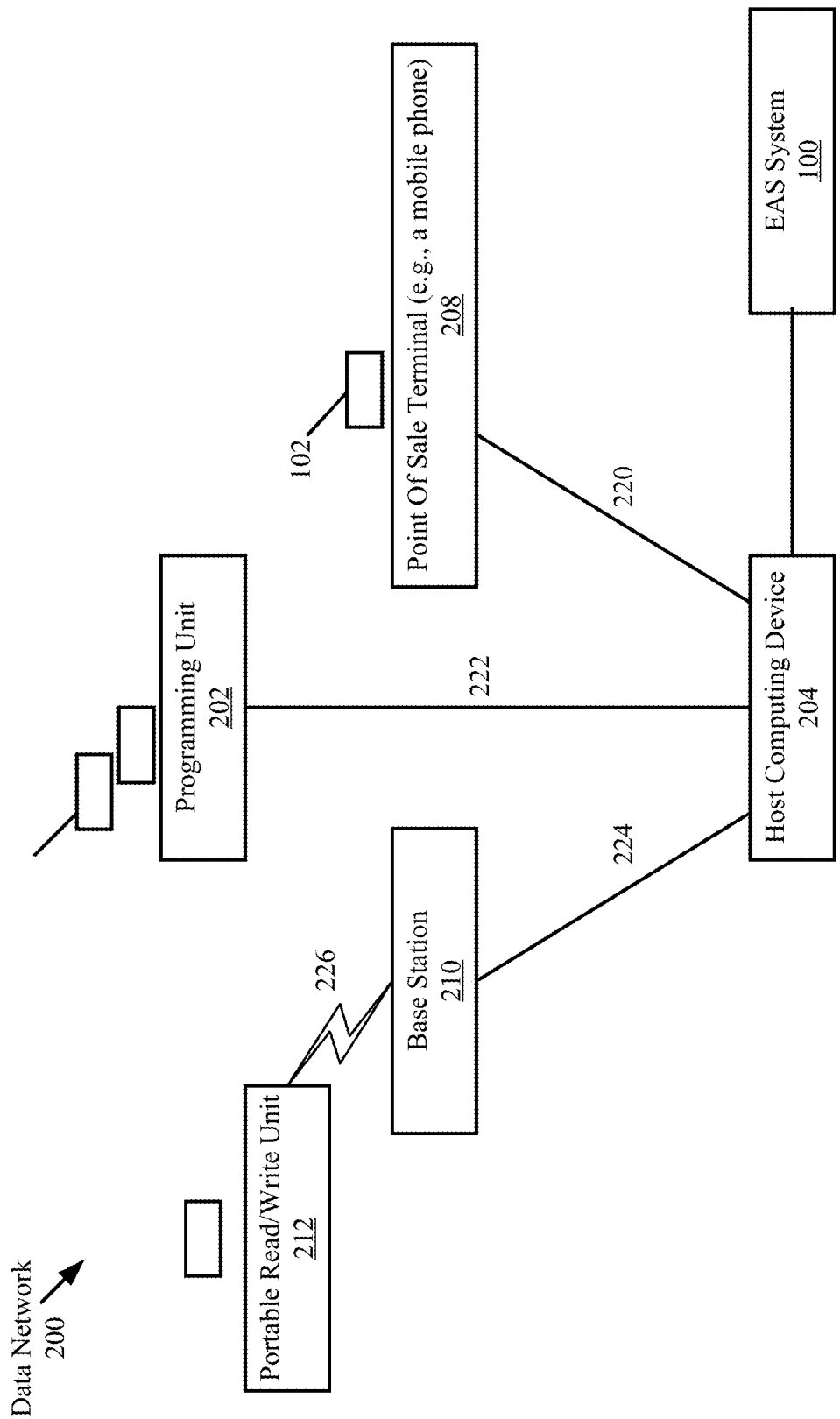
FIG. 2 is an illustration of a data network employing the EAS system of FIG. 1.

Referring now to FIG. 2, there is provided a schematic illustration of an illustrative architecture for a data network 200 in which the EAS system 100 is employed. Data network 200 comprises a host computing device 204 which stores data concerning at least one of merchandise identification, inventory, and pricing. The host computing device 204 can include, but is not limited to, a server, a personal computer, a desktop computer, and/or a laptop computer.

A first data signal path 220 allows for two-way data communication between the host computing device 204 and a POS terminal 208. The POS terminal 208 can be a stationary POS terminal or a mobile POS terminal. The mobile POS terminal can include, but is not limited to, a mobile device (e.g., a smart phone). Operations of the POS terminal will be described below.

A second data signal path 222 permits data communication between the host computing device 204 and a programming unit 202. The programming unit 202 is generally configured to write product identifying data and other information into memory of the marker 102. Marker programing units are well known in the art, and will not be described herein. Any known or to be known marker programming unit can be used herein without limitation.

A third data signal path 224 permits data communication between the host computing device 204 and a base station 210. The base station 210 is in wireless communication with a portable read/write unit 212. Base stations are well known in the art, and will not be described herein. Any known or to be known base station can be used herein without limitation.

The portable read/write unit 212 reads data from the markers for purposes of determining the inventory of the retail store, as well as writes data to the markers. Data can be written to the EAS markers when they are applied to articles of merchandise. Portable read/write units are well known in the art, and will not be described herein. Any known or to be known portable read/write unit can be used herein without limitation.

In general, the POS terminal 208 facilitates the purchase of articles from the retail store. POS terminals and purchase transactions are well known in the art, and therefore will not be described herein. Any known or to be known POS terminal and purchase transaction can be used herein without limitation. The POS terminal can be a stationary POS terminal or a mobile POS terminal.

As should be understood, alarm issuance of the EAS system 100 is not desirable when the item to which the marker 102 is coupled has been successfully purchased. Accordingly, the POS terminal 102 includes a marker deactivation functionality. Upon a successful completion of a purchase transaction, a marker deactivation process is initialized. The marker deactivation process will become more evident as the discussion progresses.

Figure 3:
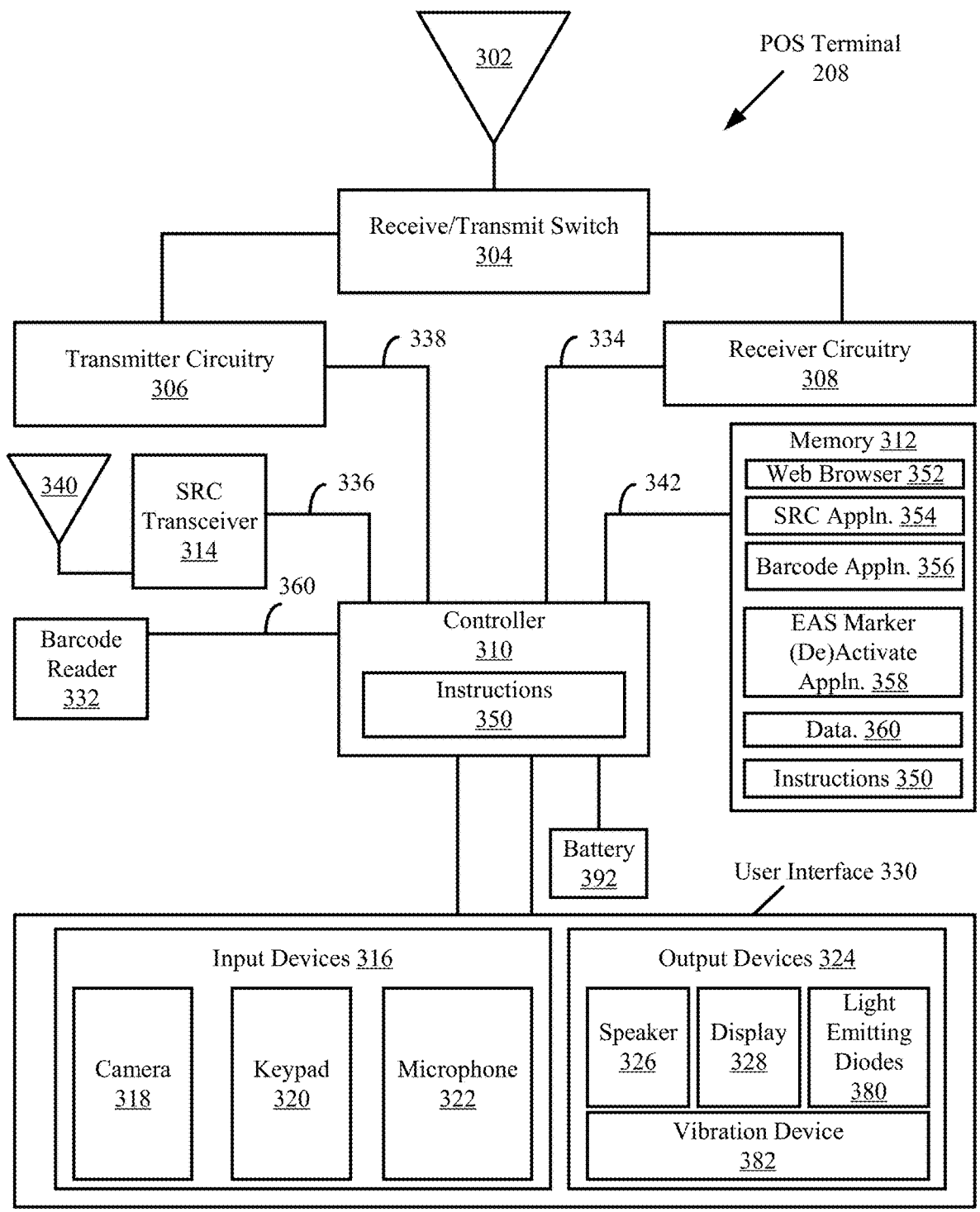
FIG. 3 is an illustration of an illustrative architecture for a POS terminal shown in FIG. 2.

Referring now to FIG. 3, there is provided an illustration of an illustrative architecture for the POS terminal 208. The architecture shown is for a mobile POS terminal. A stationary POS terminal can have a similar architecture.

POS terminal 208 may include more or less components than those shown in FIG. 3. However, the components shown are sufficient to disclose an illustrative embodiment implementing the present invention. Some or all of the components of the POS terminal 208 can be implemented in hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

The POS terminal 208 can include, but is not limited to, a notebook computer, a personal digital assistant, a cellular phone or a mobile phone with smart device functionality (e.g., a Smartphone). In this regard, the POS terminal 208 comprises an antenna 302 for receiving and transmitting Radio Frequency ("RF") signals. A receive/transmit ("Rx/Tx") switch 304 selectively couples the antenna 302 to the transmitter circuitry 306 and the receiver circuitry 308 in a manner familiar to those skilled in the art. The receiver circuitry 308 demodulates and decodes the RF signals received from an external device. The receiver circuitry 308 is coupled to a controller (or microprocessor) 310 via an electrical connection 334. The receiver circuitry 308 provides the decoded signal information to the controller 310. The controller 310 uses the decoded RF signal information in accordance with the function(s) of the POS terminal 208. The controller 310 also provides information to the transmitter circuitry 306 for encoding and modulating information into RF signals. Accordingly, the controller 310 is coupled to the transmitter circuitry 306 via an electrical connection 338. The transmitter circuitry 306 communicates the RF signals to the antenna 302 for transmission to an external device via the Rx/Tx switch 304.

The POS terminal 208 also comprises an antenna 340 coupled to a Short Range Communications ("SRC") transceiver 314 for receiving SRC signals. SRC transceivers are well known in the art, and therefore will not be described in detail herein. However, it should be understood that the SRC transceiver 314 processes the SRC signals to extract information therefrom. The SRC transceiver 314 may process the SRC signals in a manner defined by the SRC application 354 installed on the POS terminal 208. The SRC application 354 can include, but is not limited to, a Commercial Off the Shelf ("COTS") application (e.g., a Bluetooth application). The SRC transceiver 314 is coupled to the controller 310 via an electrical connection 336. The controller uses the extracted information in accordance with the function(s) of the POS terminal 208. For example, the extracted information can include a unique identifier received from EAS marker 102 of FIGS. 1-2. The unique identifier can be used by the POS terminal 208 to activate or deactivate the EAS marker as described herein. The EAS marker enable and disable functions are implemented via an EAS marker control application 358.

The controller 310 may store received and extracted information in memory 312 of the POS terminal 208. Accordingly, the memory 312 is connected to and accessible by the controller 310 through electrical connection 342. The memory 312 may be a volatile memory and/or a non-volatile memory. For example, memory 312 can include, but is not limited to, a Random Access Memory ("RAM"), a Dynamic RAM ("DRAM"), a Read Only Memory ("ROM") and a flash memory. The memory 312 may also comprise unsecure memory and/or secure memory. The memory 312 can be used to store various other types of data 360 therein, such as authentication information, cryptographic information, location information, and various work order related information.

The POS terminal 208 also may comprise a barcode reader 332. Barcode readers are well known in the art, and therefore will not be described herein. However, it should be understood that the barcode reader 332 is generally configured to scan a barcode and process the scanned barcode to extract information therefrom. The barcode reader 332 may process the barcode in a manner defined by the barcode application 356 installed on the POS terminal 208. Additionally, the barcode scanning application can use camera 318 to capture the barcode image for processing. The barcode application 356 can include, but is not limited to, a COTS application. The barcode reader 332 provides the extracted information to the controller 310. As such, the barcode reader 332 is coupled to the controller 310 via an electrical connection 360. The controller 310 uses the extracted information in accordance with the function(s) of the POS terminal 208. For example, the extracted information can be used by POS terminal 208 to enable EAS marker activate or deactivate functionalities thereof and/or obtain security information which is to be provided to a network node.

As shown in FIG. 3, one or more sets of instructions 350 are stored in memory 312. The instructions may include customizable instructions and non-customizable instructions. The instructions 350 can also reside, completely or at least partially, within the controller 310 during execution thereof by POS terminal 208. In this regard, the memory 312 and the controller 310 can constitute machine-readable media. The term "machine-readable media", as used herein, refers to a single medium or multiple media that stores one or more sets of instructions 350. The term "machine-readable media", as used here, also refers to any medium that is capable of storing, encoding or carrying the set of instructions 350 for execution by the POS terminal 208 and that causes the POS terminal 208 to perform one or more of the methodologies of the present disclosure.

The controller 310 is also connected to a user interface 330. The user interface 330 comprises input devices 316, output devices 324 and software routines (not shown in FIG. 3) configured to allow a user to interact with and control software applications (e.g., software applications 352-358 and other software applications) installed on the POS terminal 208. Such input and output devices may include, but are not limited to, a display 328, a speaker 326, a keypad 320, a directional pad (not shown in FIG. 3), a directional knob (not shown in FIG. 3), a microphone 322, and a camera 318. The display 328 may be designed to accept touch screen inputs. As such, user interface 330 can facilitate a user software interaction for launching applications (e.g., software applications 352-358 and other software applications) installed on the POS terminal 208. The user interface 330 can facilitate a user-software interactive session for: initiating communications with an external device; writing data to and reading data from memory 312; and/or initiating EAS marker control processes for activating or deactivating an EAS marker.

The display 328, keypad 320, directional pad (not shown in FIG. 3) and directional knob (not shown in FIG. 3) can collectively provide a user with a means to initiate one or more software applications or functions of the POS terminal 208. The application software 352-358 can facilitate the data exchange (a) a user and the POS terminal 208, (b) the POS terminal 208 and a host computing device 204, and/or (c) the POS terminal 208 and an EAS marker via non-SRC and/or SRC communications. In this regard, the application software 352-358 performs one or more of the following: verify the identity of a user of POS terminal 208 via an authentication process; present information to the user indicating this his/her identity has or has not been verified; and/or present a Graphical User Interface ("GUI") to the user for enabling the user to initiate and complete a purchase transaction.

Illustrative Marker Architectures

The marker 102 of FIG. 1 can have many different structures depending on a given application. Illustrative marker architectures will be described below. Marker 102 can have the same or substantially similar architecture as any one of the markers discussed herein.

Figure 4:
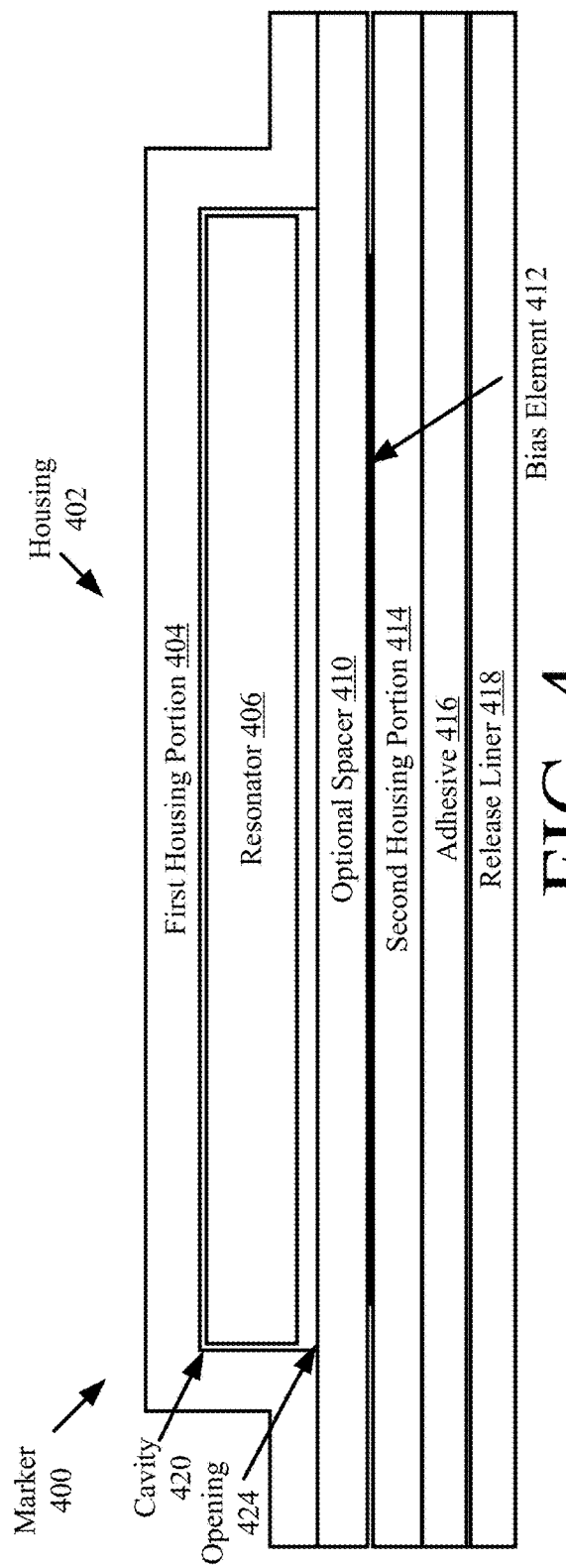
FIG. 4 is an illustration of an illustrative conventional marker.

Referring now to FIG. 4, there is provided an illustration of an illustrative conventional marker 400. The conventional marker 400 comprises a housing 402 formed of a first housing portion 404 and a second housing portion 414. The housing 402 can include, but is not limited to, a high impact polystyrene. An adhesive 416 and release liner 418 are optionally disposed on the bottom surface of the second housing portion 414 so that the marker 400 can be attached to an article (e.g., a piece of merchandise or product packaging).

A cavity 420 is formed in the first housing portion 404. A resonator 406 is disposed in the cavity 420. The resonator 406 has a generally rectangular shape and a planar cross-sectional profile. A spacer 410 is optionally disposed so as to seal an opening 424 of the cavity 420 whereby the resonator 406 is securely disposed and retained in the cavity 420. The spacer 410 can include, but is not limited to, a low density polyethylene.

A bias element 412 is disposed between the spacer 410 and the second housing portion 414. The bias element 412 includes, but is not limited to, an iron-based semi-hard magnet. The spacer 410 is optionally provided so that the physical spacing of and between the bias element 412 and the resonator 408 can be maintained. In FIG. 4, the bias element 412 is shown as being thinner than the resonator 408. This is not drawn to scale. Typically, the bias element 412 has a thickness that is the same as or greater than the thickness of the resonator 408, as shown in FIG. 4.

Figure 5:
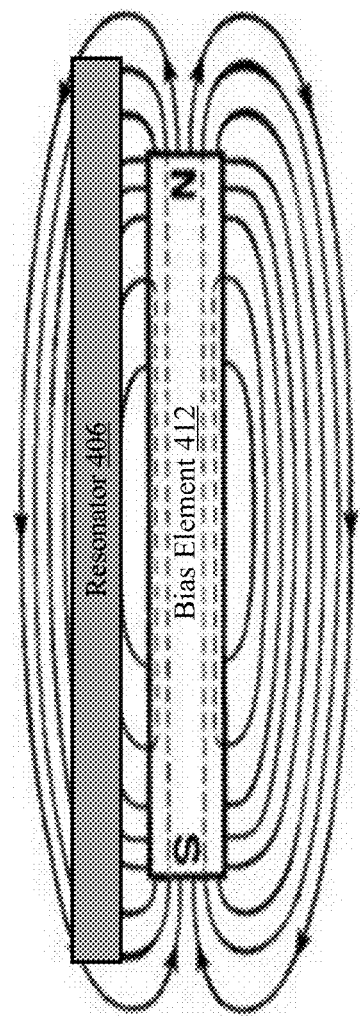
FIG. 5 is an illustration of the magnetic flux lines of the bias element of FIG. 4.

FIG. 5 shows the magnetic flux lines of the bias element 412 being applied to the resonator 406. As shown in FIG. 5, the resonator 406 is located in the middle of the magnetic field. In effect, the magnetic flux lines run generally normal to the length of the resonator. Consequently, the resonator 406 is pulled towards the bias element 412.

Notably, the conventional marker 200 suffers from certain drawbacks. For example, the conventional marker 200 is deactivated by demagnetization of the bias element 412. The bias element is demagnetized with an AC electromagnetic field that decays in strength. A significant amount of energy is required to produce the decaying AC electromagnetic field. This conventional configuration is not compatible with the current move toward self-checkout using a mobile POS terminal as the checkout interface.

The present solution overcomes these drawbacks of the conventional marker 400. The manner in which the drawbacks of the conventional marker 400 are overcome by the present solution will be become evident as the discussion progresses.

Figure 6:
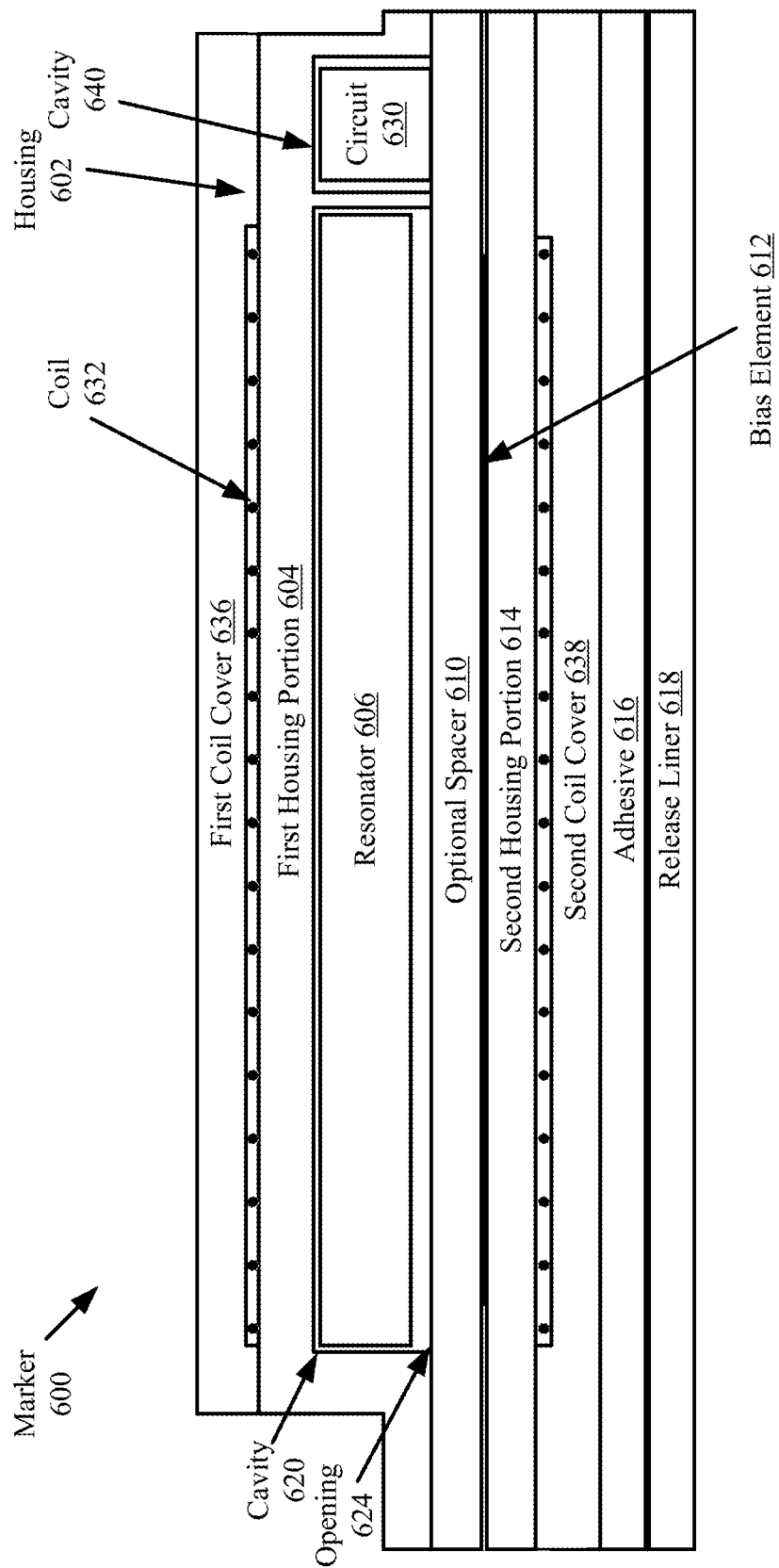
FIG. 6 is an illustration of an illustrative architecture for a marker with an internal deactivation feature.

Referring now to FIG. 6, there is provided an illustration of an architecture for a marker 600 shown in FIG. 6. Marker 600 is not limited to the structure shown in FIG. 6. The marker 600 can have any security tag, label or marker architecture depending on a given application.

As shown in FIG. 6, marker 600 comprises a housing 602 formed of a first housing portion 604 and a second housing portion 614. The housing 602 can include, but is not limited to, a high impact polystyrene. Optionally, an adhesive 616 and release liner 618 are disposed on the bottom surface of the marker 600 so that the marker can be attached to an article (e.g., a piece of merchandise or product packaging).

Figure 7:
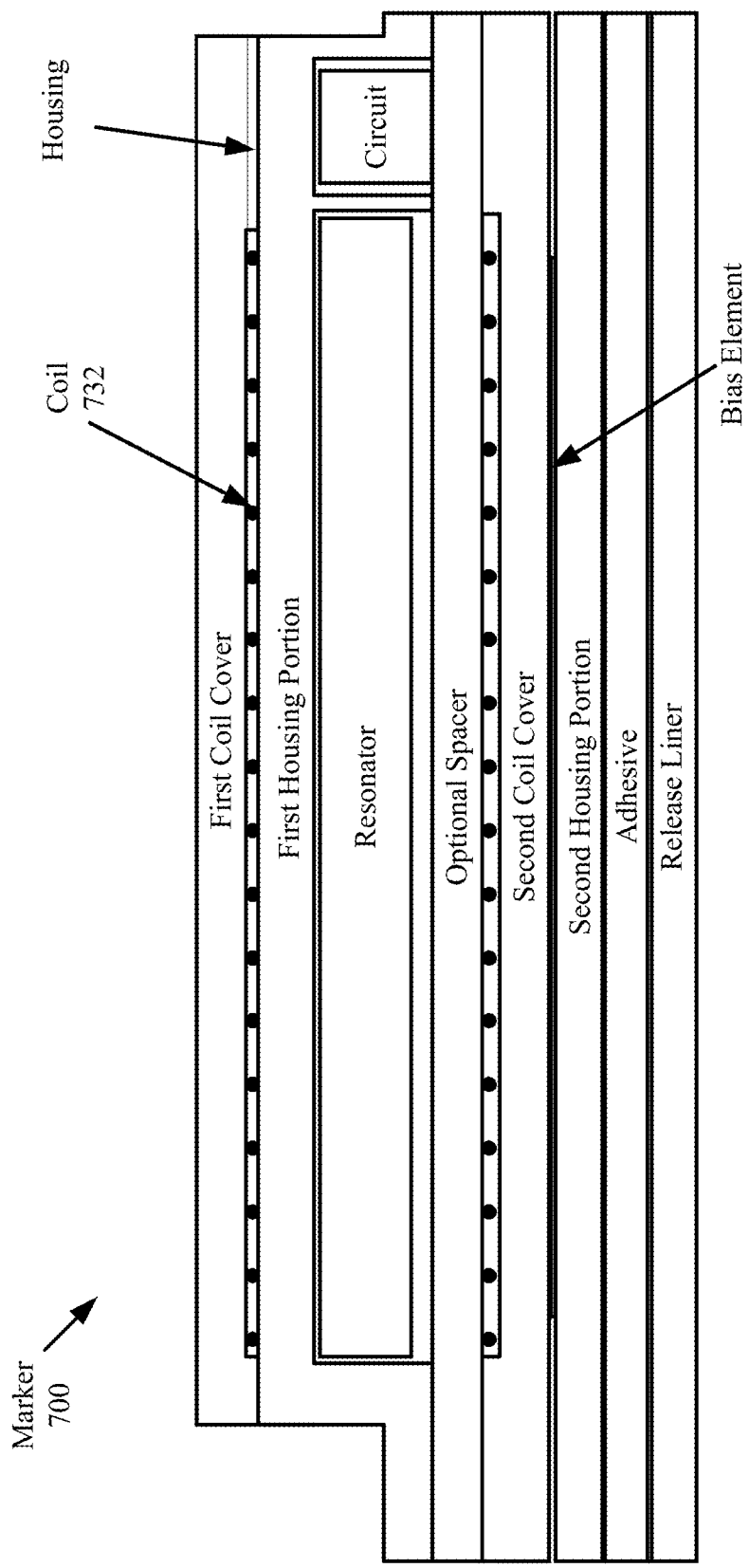
FIG. 7 is an illustration of another illustrative architecture for a marker with an internal deactivation feature.

Two cavities 620, 640 are formed in the first housing portion 604. At least one resonator 606 is disposed in a first cavity 620, and a circuit 630 is disposed in a second cavity 640. A more detailed diagram of the circuit 630 is provided in FIG. 8. As shown in FIG. 8, the circuit 630 generally comprises a deactivation element 810 connected in series with a coil 632. In some scenarios, the coil 632 is disposed around the resonator(s) 606 and the bias element 612, as shown in FIG. 6. However, in other scenarios, the coil is disposed around the resonator(s) but not the bias element, as shown in FIG. 7. The coil is covered by first and second coil covers 636, 638. The deactivation element 810 includes, but is not limited to, a capacitor which is connected in series with the coil 632. During operation, a voltage is selectively applied to the capacitor so as to short the coil 632, whereby the marker 600 becomes deactivated. The shorted coil prevents the resonator from receiving transmit bursts emitted from an EAS system (e.g., EAS system 100 of FIG. 1). In effect, the resonator(s) 606 does not vibrate in response to the transmit bursts.

The circuit 630 also comprises a communications element 806 which is powered by an energy harvesting element 804. Energy harvesting circuits are well known in the art, and therefore will not be described herein. Any known or to be known energy harvesting circuit can be used herein without limitation. Such known energy harvesting circuits are described in U.S. patent application Ser. Nos. 15/833,183 and 15/806,062. In some scenarios, the energy harvesting element 804 is configured to collect RF energy or NFC energy via antenna 802 and charge an energy storage device (e.g., a capacitor) using the collected RF or NFC energy. The stored energy enables operations of the communications element 806. An output voltage of the energy storage device is supplied to the communications element 806 via connection 824.

The communications element 806 is configured to act as a transponder in connection with the article identification aspects of the EAS system (e.g., EAS system 100 of FIG. 1). In this regard, the communications element 806 stores multi-bit identification data and emits an identification signal corresponding to the stored multi-bit identification data. The identification signal is emitted in response to the reception of the interrogation signal (e.g., the interrogation signal transmitted from the antenna pedestals 112, 116 of FIG. 1, POS terminal 208 of FIG. 2, and/or portable read/write unit 212 of FIG. 2). In some scenarios, the transponder circuit of the communications element 806 is the model 210 transponder circuit available from Gemplus, Z. I. Athelia III, Voie Antiope, 13705 La Ciotat Cedex, France. The model 210 transponder circuit is a passive transponder which operates at 13 MHz and has a considerable data storage capability.

The communications element 806 is also configured to facilitate the deactivation of the marker 600. The marker is deactivated when the AM element 826 (i.e., resonator(s) 606 and/or bias element 612) is deactivated. The AM element deactivation is achieved via a deactivation element 810 connected to the coil 632. The deactivation element 810 is generally configured to selectively short the coil 632 so that the resonator(s) 606 does not receive energy emitted from an EAS system 100. The coil shorting is performed in response to the communications element reception of a marker deactivation signal (e.g., the marker deactivation signal transmitted from the antenna pedestals 112, 116 of FIG. 1, POS terminal 208 of FIG. 2, and/or portable read/write unit 212 of FIG. 2).

Figure 8B:
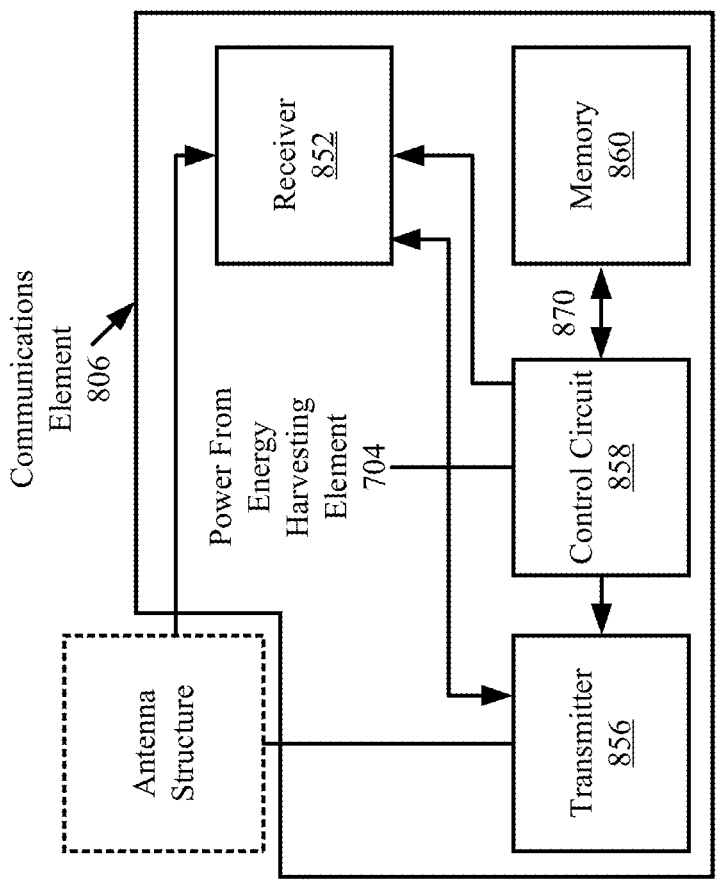

Referring now to FIG. 8B, there is provided a block diagram of an illustrative architecture for the communications element 806. The communications element 806 may include more or less components than those shown in FIG. 8B. However, the components shown are sufficient to disclose an illustrative embodiment implementing the present solution. Some or all of the components of the communications element 806 can be implemented in hardware, software and/or a combination of hardware and software. The hardware includes, but is not limited to, one or more electronic circuits. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

The communications element 806 comprises a transmitter 856, a control circuit 858, memory 860 and a receiver 852. Notably, components 856 and 852 are coupled to an antenna structure 858 when implemented in the marker 600. As such, an antenna structure is shown in FIG. 8B as being external to the communications element 806. The antenna structure is tuned to receive a signal that is at an operating frequency of the EAS system (e.g., EAS system 100 of FIG. 1). For example, the operating frequency to which the antenna structure is tuned may be 13 MHz.

The control circuit 858 controls the overall operation of the communications element 806. Connected between the antenna structure and the control circuit 858 is a receiver 852. The receiver 852 captures data signals carried by a carrier signal to which the antenna structure is tuned. In some scenarios, the data signals are generated by on/off keying the carrier signal. The receiver 852 detects and captures the on/off keyed data signal.

Also connected between the antenna structure and the control circuit 858 is the transmitter 856. The transmitter 856 operates to transmit a data signal via the antenna structure. In some scenarios, the transmitter 856 selectively opens or shorts at least one reactive element (e.g., reflectors and/or delay elements) in the antenna structure to provide perturbations in an RFID interrogation signal, such as a specific complex delay pattern and attenuation characteristics. The perturbations in the interrogation signal are detectable by a marker reader (e.g., the EAS system 100 of FIG. 1, portable read/write unit 212 of FIG. 2, the POS terminal 208 of FIG. 2, and/or the programming unit 202 of FIG. 2).

The control circuit 858 may store various information in memory 860. Accordingly, the memory 860 is connected to and accessible by the control circuit 858 through electrical connection 870. The memory 860 may be a volatile memory and/or a non-volatile memory. For example, memory 862 can include, but is not limited to, a Radon Access Memory ("RAM"), a Dynamic RAM ("DRAM"), a Read Only Memory ("ROM") and a flash memory. The memory 860 may also comprise unsecure memory and/or secure memory. The memory 860 can be used to store identification data which may be transmitted from the communications element 806 via an identification signal. The memory 860 may also store other information received by receiver 852. The other information can include, but is not limited to, information indicative of the handling or sale of an article.

The components 856, 858, 852 are connected to the energy harvesting element 804 which accumulates power from a signal induced in an antenna 802 as a result of the reception of an RFID signal. The energy harvesting element 804 is configured to supply power to the transmitter 856, control circuit 858, and receiver 852. The energy harvesting element 804 may include, but is not limited to, a storage capacitor.

Figure 9:
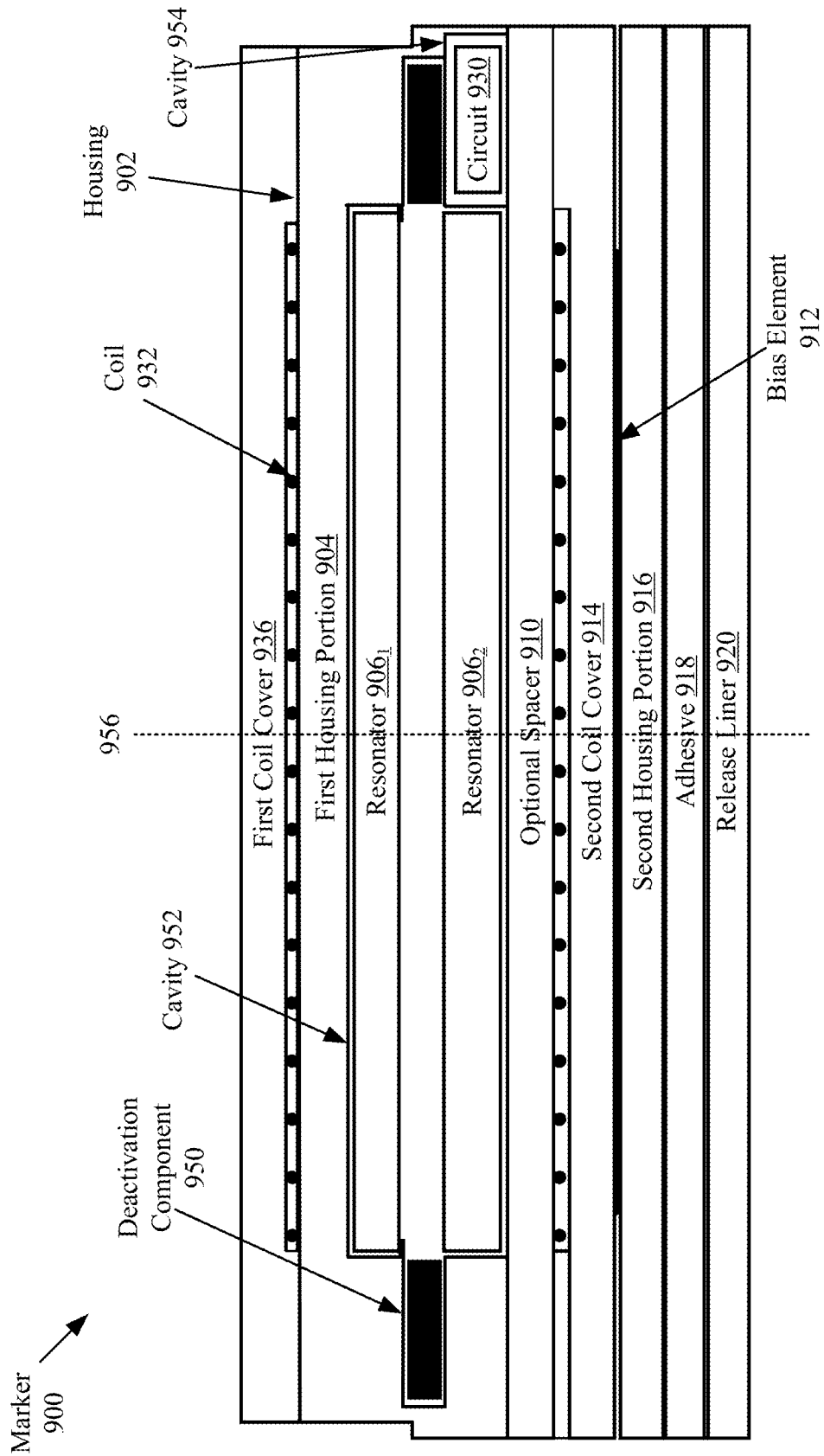
FIG. 9 is an illustration of another illustrative architecture for a marker with an internal deactivation feature.

Referring now to FIG. 9, there is provided an illustration of another illustrative marker 900 architecture. Marker 900 is not limited to the structure shown in FIG. 9. The marker 900 can have any security tag, label or marker architecture depending on a given application.

As shown in FIG. 9, marker 900 comprises a housing 902 formed of a first housing portion 904 and a second housing portion 916. The housing 902 can include, but is not limited to, a high impact polystyrene. Optionally, an adhesive 918 and release liner 920 are disposed on the bottom surface of the marker 900 so that the marker can be attached to an article (e.g., a piece of merchandise or product packaging).

Figure 10:
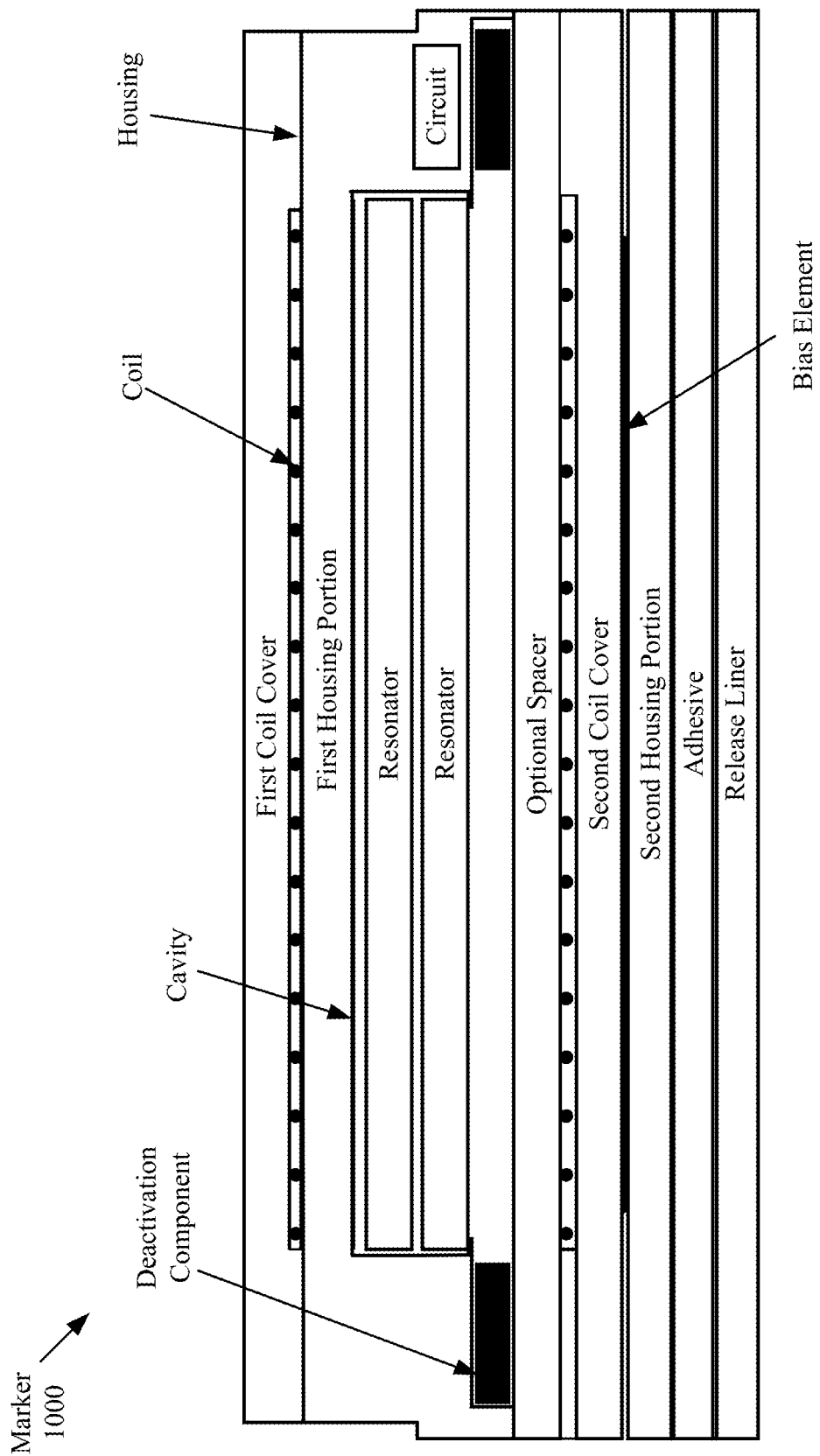
FIG. 10 is an illustration of another illustrative architecture for a marker with an internal deactivation feature.

Two cavities 952, 954 are formed in the first housing portion 904. At least one resonator $906_1$, $906_2$ and at least one deactivation component 950 are disposed in a first cavity 952, and a circuit 930 is disposed in a second cavity 954. The deactivation component 950 is disposed in proximity to the resonator(s) $906_1$, $906_2$. The deactivation component 950 comprises two elements respectively located at opposing ends of the resonator(s) $906_1$, $906_2$ (i.e., horizontally offset from the resonator(s) end(s)). In some scenarios, the deactivation component 950 is located in between two resonator(s) along a vertical axis 956, as shown in FIG. 9. In other scenarios, the deactivation component is located below the resonator(s) along the vertical axis, as shown in FIG. 10. Still, in other scenarios, the deactivation component is located above the resonator(s) along the vertical axis (not shown).

The deactivation component 950 comprises a Ferrofluid or a Magnetorheological fluid. These types of fluids are liquids that become strongly magnetized in the presence of a magnetic field. The deactivation component's 950 state of matter changes from a liquid state to a solid state with the application of a magnetic field. The magnetic field is provided by the bias element 912. When the marker 900 is activated, the deactivation component 950 is in its solid state. When the marker 900 is to be deactivated, the bias element's magnetic field is normalized so that the deactivation component 950 loses viscosity and flows above, below or in between the resonator(s). The deactivation component 950 once again stiffens when the bias element's magnetic field is no longer being normalized. In effect, the resonator(s) $906_1$, $906_2$ is(are) mechanically prevented from exhibiting a resonant behavior (i.e., vibrating or oscillating) by the Ferrofluid or Magnetorheological fluid.

The bias element's magnetic field is normalized via the generation of a deactivate magnetic field that momentarily opposes the bias element's magnetic field (e.g., a 6 Oe magnetic field). The deactivate magnetic field is generated by circuit 930. A more detailed diagram of the circuit 930 is provided in FIG. 11.

Figure 11:
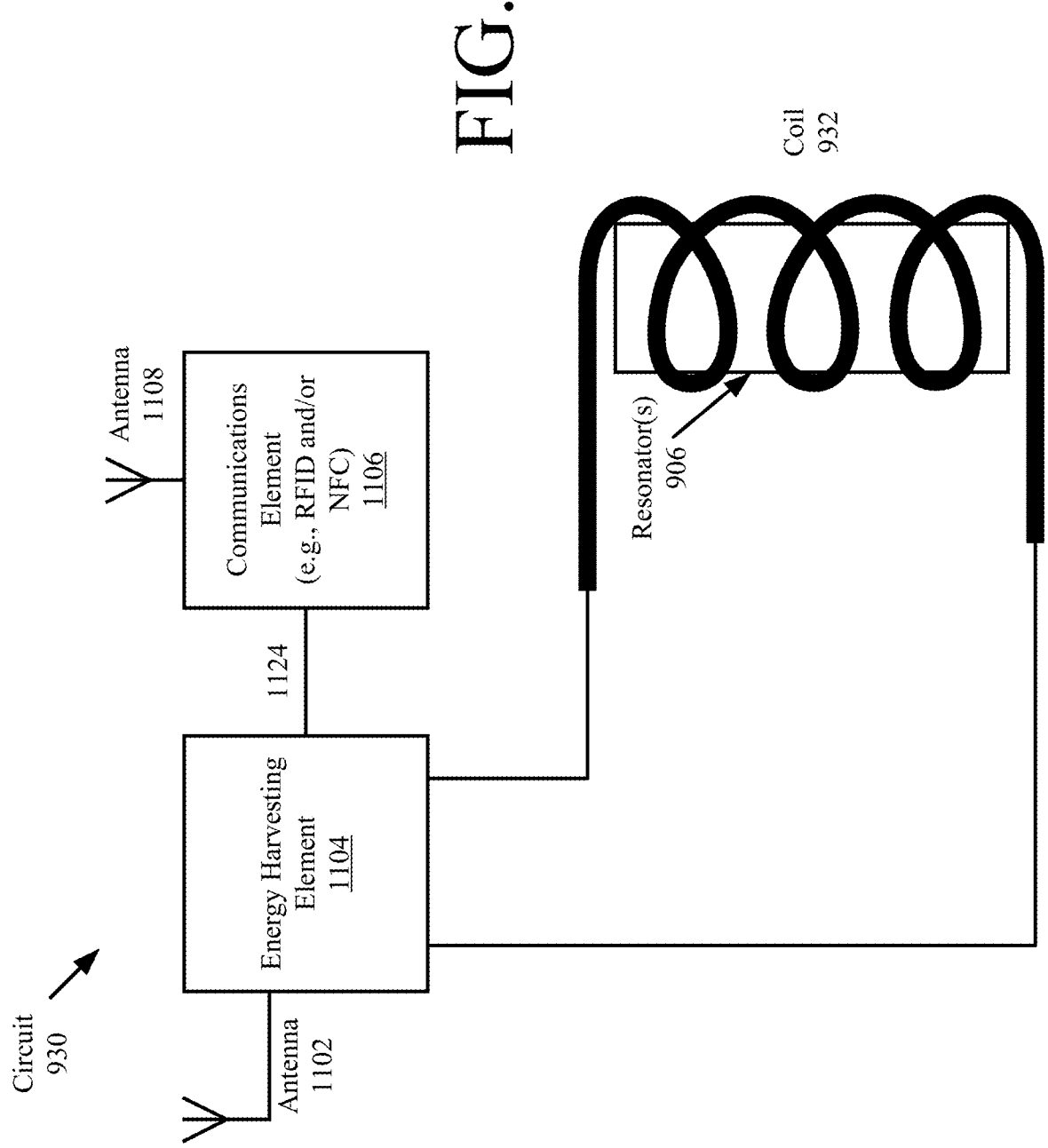
FIG. 11 is a diagram of the circuit shown in FIG. 9.

As shown in FIG. 11, the circuit 930 generally comprises an energy harvesting element 1104 connected in series with a coil 932. In some scenarios, the coil 932 is disposed around the resonator(s) $906_1$, $906_2$, as shown in FIGS. 9-10. However, in other scenarios, the coil is additionally disposed around the bias element (not shown in FIGS. 9-11). The coil is covered by first and second coil covers 936, 914. During operation, the energy harvesting element 1104 is activated by the communications element 1106. When activated, the energy harvesting element 1104 supplies power as a DC pulse to the coil 932 creating a DC field to oppose the bias element's magnetic field, whereby the marker 900 becomes deactivated. Subsequently, the energy harvesting element 1104 is deactivated such that it no longer supplies power to the coil. At this time, the bias element's magnetic field is no longer normalized and the deactivation component 950 stiffens. The stiffened deactivation component 950 mechanically prevents the resonator(s) 906$_1$, 906$_2$ from exhibiting a resonant behavior (i.e., vibrating or oscillating).

The communications element 1106 which is powered by an energy harvesting element 1104. Energy harvesting circuits are well known in the art, and therefore will not be described herein. Any known or to be known energy harvesting circuit can be used herein without limitation. Such known energy harvesting circuits are described in U.S. patent application Ser. Nos. 15/833,183 and 15/806,062. In some scenarios, the energy harvesting element 1104 is configured to collect RF energy or NFC energy via antenna 1102 and charge an energy storage device (e.g., a capacitor) using the collected RF or NFC energy. The stored energy enables operations of the communications element 1106. An output voltage of the energy storage device is supplied to the communications element 1106 via connection 1124.

The communications element 1106 is configured to act as a transponder in connection with the article identification aspects of the EAS system (e.g., EAS system 100 of FIG. 1). In this regard, the communications element 1106 stores multi-bit identification data and emits an identification signal corresponding to the stored multi-bit identification data. The identification signal is emitted in response to the reception of the interrogation signal (e.g., the interrogation signal transmitted from the antenna pedestals 112, 116 of FIG. 1, POS terminal 208 of FIG. 2, and/or portable read/write unit 212 of FIG. 2). In some scenarios, the transponder circuit of the communications element 1106 is the model 210 transponder circuit available from Gemplus, Z. I. Athelia III, Voie Antiope, 13705 La Ciotat Cedex, France. The model 210 transponder circuit is a passive transponder which operates at 13 MHz and has a considerable data storage capability.

The communications element 1106 is also configured to facilitate the deactivation of the marker 900. In this regard, the communications element 1106 is configured to selectively cause power to the supplied to and removed from the deactivation element 1110. The coil 932 is shorted when power is supplied to the deactivation element 1110. The coil shorting is performed in response to the communications element reception of a marker deactivation signal (e.g., the marker deactivation signal transmitted from the antenna pedestals 112, 116 of FIG. 1, POS terminal 208 of FIG. 2, and/or portable read/write unit 212 of FIG. 2).

Figure 12:
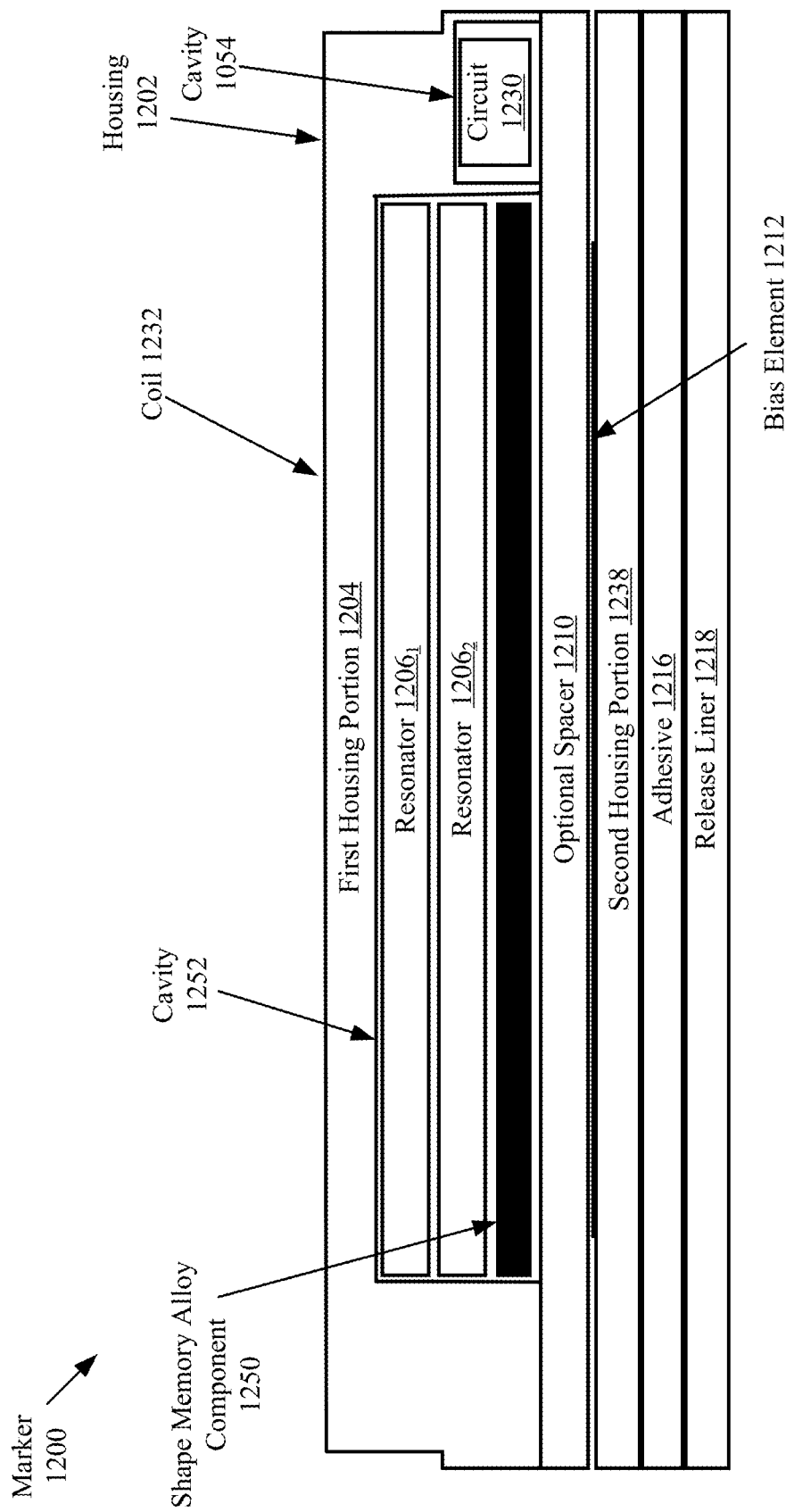
FIG. 12 is an illustration of another illustrative architecture for a marker with an internal deactivation feature.

Referring now to FIG. 12, there is provided an illustration of another illustrative marker 1200 architecture. Marker 1200 is not limited to the structure shown in FIG. 12. The marker 1200 can have any security tag, label or marker architecture depending on a given application.

As shown in FIG. 12, marker 1200 comprises a housing 1202 formed of a first housing portion 1204 and a second housing portion 1238. The housing 1202 can include, but is not limited to, a high impact polystyrene. Optionally, an adhesive 1216 and release liner 1218 are disposed on the bottom surface of the marker 1200 so that the marker can be attached to an article (e.g., a piece of merchandise or product packaging).

Two cavities 1252, 1254 are formed in the first housing portion 1204. At least one resonator 1206$_1$, 1206$_2$ and at least one shape memory alloy component 1250 are disposed in a first cavity 1252, and a circuit 1230 is disposed in a second cavity 1254. The shape memory alloy component 1250 is disposed in proximity to the resonator(s) 1206$_1$, 1206$_2$. The shape memory alloy component is disposed vertically below the resonator(s) 906$_1$, 906$_2$. The present solution is not limited in this regard. The shape memory alloy component can alternatively or additionally be disposed above or to the side(s) of the resonator(s) 906$_1$, 906$_2$.

The shape memory alloy component 1250 can have any shape selected in accordance with a particular application. For example, the shape memory alloy component has a wire shape, a ribbon shape (as shown in FIG. 12), an L-shape, or a U-shape. The shape memory alloy component 1250 changes shape with the application of heat thereto. The shape memory alloy component 1250 is heated via a signal from an external device (e.g., the POS terminal 208 of FIG. 2 or the customer's mobile phone). When heated, the shape memory alloy component 1250 deforms (e.g., bends or curls) and mechanically pushes the resonator(s) 906$_1$, 906$_2$ against at least one side wall of the cavity 1052, whereby the resonator(s) is(are) unable to exhibit a resonant behavior (i.e., vibrating or oscillating).

Figure 13:
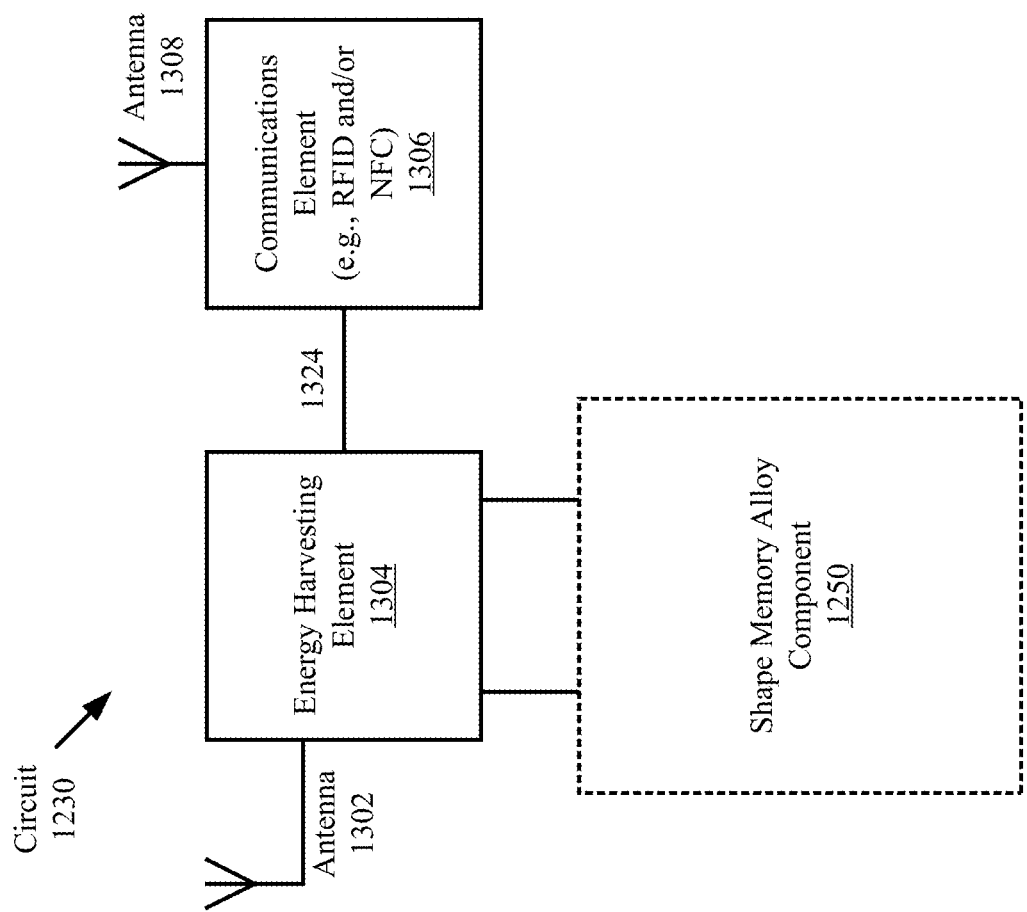
FIG. 13 is a diagram of the circuit shown in FIG. 12.

The shape memory alloy component 1250 is heated by circuit 1230. A more detailed diagram of the circuit 1230 is provided in FIG. 13. As shown in FIG. 13, the circuit 1230 generally comprises an energy harvesting element 1304 connected in series with the shape memory alloy component 1250.

Energy harvesting circuits are well known in the art, and therefore will not be described herein. Any known or to be known energy harvesting circuit can be used herein without limitation. Such known energy harvesting circuits are described in U.S. patent application Ser. Nos. 15/833,183 and 15/806,062. In some scenarios, the energy harvesting element 1104 is configured to collect RF energy or NFC energy via antenna 1102 and charge an energy storage device (e.g., a capacitor) using the collected RF or NFC energy. The collected energy is used by the energy harvesting element 1304 to supply an electric current to the shape memory alloy component 1250. In effect, the shape memory alloy component 1250 deforms such that the shape memory alloy component pushes the resonator(s) 1206$_1$, 1206$_2$ against at least one side wall of the cavity 1252, whereby the resonator(s) 1206$_1$, 1206$_2$ become(s) clamped between the shape memory alloy component 1250 and the side wall(s). When clamped, the marker 1200 is deactivated since the resonator(s) 1206$_1$, 1206$_2$ is(are) mechanically prevented from exhibiting a resonant behavior (i.e., vibrating or oscillating). The marker 1200 may be a re-usable marker. In this case, the shape memory alloy component 1250 may be configured to return to its original or non-deformed shape when the electric current is no longer applied thereto. When returned to its original or non-deformed shape, the marker 1200 is re-activated.

The circuit 1230 also comprises a communications element 1306 which is powered by the energy harvesting element 1304. The energy stored by the energy harvesting element 1304 enables operations of the communications element 1306. An output voltage of the energy storage device is supplied to the communications element 1306 via connection 1324.

The communications element 1306 is configured to act as a transponder in connection with the article identification aspects of the EAS system (e.g., EAS system 100 of FIG. 1). In this regard, the communications element 1306 stores multi-bit identification data and emits an identification signal corresponding to the stored multi-bit identification data. The identification signal is emitted in response to the reception of the interrogation signal (e.g., the interrogation signal transmitted from the antenna pedestals 112, 116 of FIG. 1, POS terminal 208 of FIG. 2, and/or portable read/write unit 212 of FIG. 2). In some scenarios, the transponder circuit of the communications element 1306 is the model 210 transponder circuit available from Gemplus, Z. I. Athelia III, Voie Antiope, 13705 La Ciotat Cedex, France. The model 210 transponder circuit is a passive transponder which operates at 13 MHz and has a considerable data storage capability.

The communications element 1306 is also configured to facilitate the deactivation of the marker 1200. In this regard, the communications element 1306 is configured to selectively cause power to be supplied to and removed from the shape memory alloy component 1250. Electric current is supplied from the energy harvesting element 1304 to the shape memory alloy component 1250 when the energy harvesting element 1304 is activated by the communications element 1306. The selective supply of electric current to the shape memory alloy component 1250 is performed in response to the communications element's reception of a marker deactivation signal (e.g., the marker deactivation signal transmitted from the antenna pedestals 112, 116 of FIG. 1, POS terminal 208 of FIG. 2, and/or portable read/write unit 212 of FIG. 2).

Figure 14:
FIG. 14 is an illustration of another illustrative architecture for a marker with an internal deactivation feature.

Referring now to FIG. 14, there is provided an illustration of an illustrative marker 1400. The marker 1400 comprises a housing 1420 formed of a first housing portion 1420 and a second housing portion 1414. The housing 1420 can include, but is not limited to, a high impact polystyrene. An adhesive 1416 and release liner 1418 are optionally disposed on the bottom surface of the second housing portion 1414 so that the marker 1400 can be attached to an article (e.g., a piece of merchandise or product packaging).

A cavity 1452 is formed in the first housing portion 1402. At least one resonator 1406$_1$, 1406$_2$ is disposed in the cavity 1452. The resonator 1406$_1$, 1406$_2$ has a generally rectangular shape and a planar cross-sectional profile. A spacer 1410 is optionally disposed so as to seal an opening of the cavity 1452 whereby the resonator 1406$_1$, 1406$_2$ is securely disposed and retained in the cavity 1452. The spacer 1410 can include, but is not limited to, a low density polyethylene.

A bias element 1412 is disposed between the spacer 1410 and the second housing portion 1414. The bias element 1412 includes, but is not limited to, an iron-based semi-hard magnet. The spacer 1410 is optionally provided so that the physical spacing of and between the bias element 1412 and the resonator 1406$_1$, 1406$_2$ can be maintained. In FIG. 14, the bias element 1412 is shown as being thinner than the resonator 1406$_1$, 1406$_2$. This is not drawn to scale. Typically, the bias element 1412 has a thickness that is the same as or greater than the thickness of the resonator.

An electrophoretic component 1404 is also disposed in the cavity 1452 so as to reside above the resonator(s) 1406$_1$, 1406$_2$. The present solution is not limited in this regard. The electrophoretic component 1404 could alternatively reside below the resonator(s) 1406$_1$, 1406$_2$, but above the bias element 1412. The electrophoretic component 1404 includes, but is not limited to, an electronic ink display. Electronic ink displays are well known in the art, and therefore will not be described herein. Any known or to be known electronic ink display can be used herein without limitation. An electronic ink display works by using microcapsules that are suspended in a liquid placed within a film layer. The microcapsules contain both positively charged white particles and negatively charged black particles. The microcapsules are used to deactivate the marker 1400. In this regard, a voltage is applied to the electronic ink display so as to cause an alignment of all the particles in the same direction. When such a particle alignment occurs, the bias element's magnetic field is normalized. In this case, the resonator(s) 1406$_1$, 1406$_2$ will no longer resonate at the EAS system's operating frequency (e.g., 58 KHz).

Figure 15:
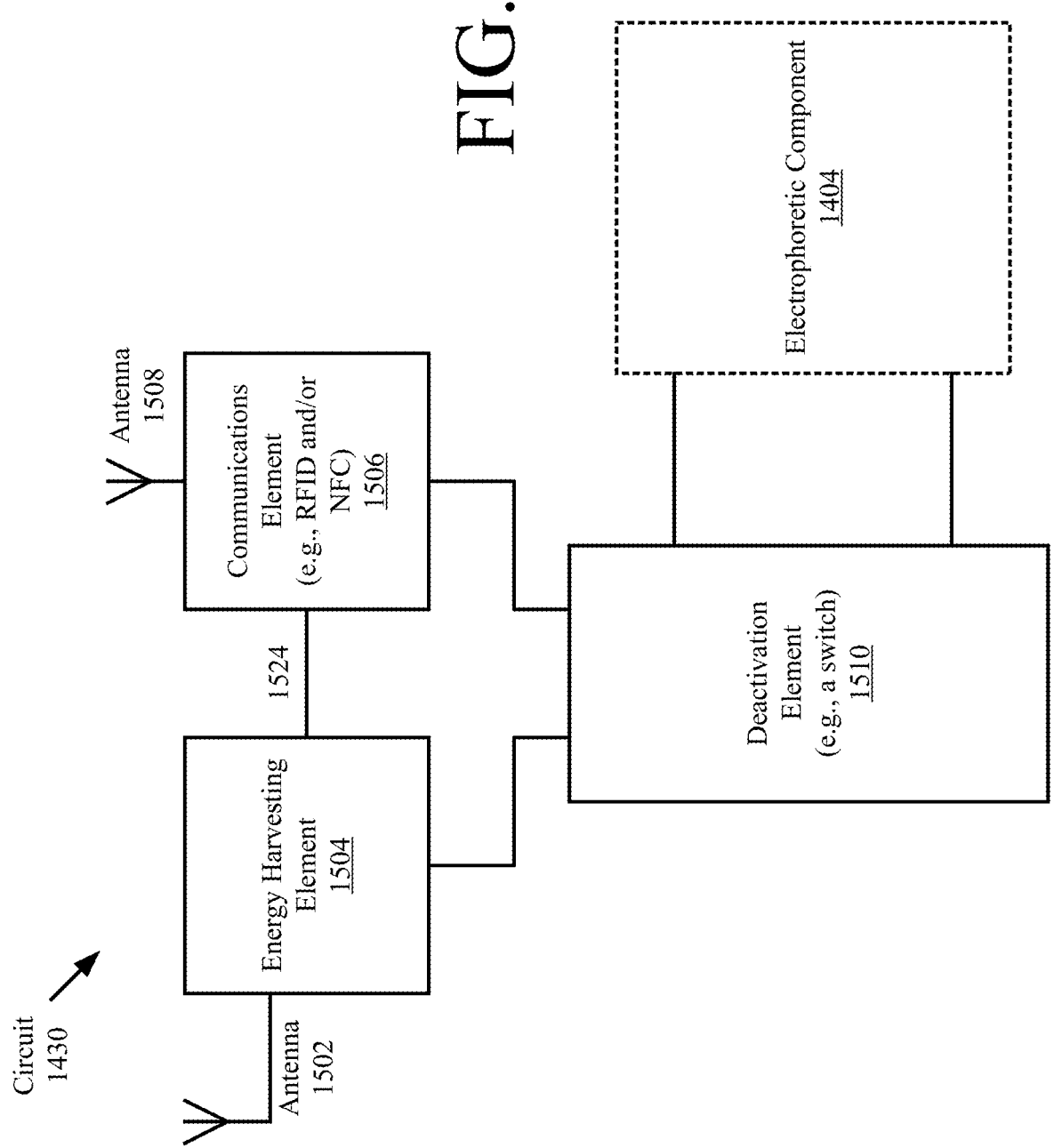
FIG. 15 is a diagram of the circuit shown in FIG. 14.

A circuit 1430 is provided for controlling the electrophoretic component 1404. A more detailed diagram of the circuit 1430 is provided in FIG. 15. As shown in FIG. 15, the circuit 1430 generally comprises a deactivation element 1510 connected in series with the electrophoretic component 1404.

The deactivation element 1510 includes, but is not limited to, a switch which is normally in an open position. During operation, the switch is selectively closed so as electrically connect an energy harvesting element 1504 to the electrophoretic component 1404. Energy harvesting circuits are well known in the art, and therefore will not be described herein. Any known or to be known energy harvesting circuit can be used herein without limitation. Such known energy harvesting circuits are described in U.S. patent application Ser. Nos. 15/833,183 and 15/806,062. In some scenarios, the energy harvesting element 1504 is configured to collect RF energy or NFC energy via antenna 1502 and charge an energy storage device (e.g., a capacitor) using the collected RF or NFC energy. The collected energy is used by the energy harvesting element 1504 to supply an electric current or voltage to the electrophoretic component 1404. In effect, the bias element's magnetic field is normalized via a magnetic field generated by the electrophoretic component 1404. When the bias element's magnetic field is normalized, the marker 1400 is deactivated since the resonator(s) 1406$_1$, 1406$_2$ will no longer resonate at the EAS system's operating frequency (e.g., 58 KHz).

The marker 1400 may be a re-usable marker. In this case, the current or voltage can be removed from the electrophoretic component 1404 such that the bias element's magnetic field is no longer normalized. When this occurs, the marker 1400 is re-activated.

The circuit 1430 also comprises a communications element 1506 which is powered by the energy harvesting element 1504. The energy stored by the energy harvesting element 1504 enables operations of the communications element 1506. An output voltage of the energy storage device is supplied to the communications element 1506 via connection 1524.

The communications element 1506 is configured to act as a transponder in connection with the article identification aspects of the EAS system (e.g., EAS system 100 of FIG. 1). In this regard, the communications element 1506 stores multi-bit identification data and emits an identification signal corresponding to the stored multi-bit identification data. The identification signal is emitted in response to the reception of the interrogation signal (e.g., the interrogation signal transmitted from the antenna pedestals 112, 116 of FIG. 1, POS terminal 208 of FIG. 2, and/or portable read/write unit 212 of FIG. 2). In some scenarios, the transponder circuit of the communications element 1506 is the model 210 transponder circuit available from Gemplus, Z. I. Athelia III, Voie Antiope, 13705 La Ciotat Cedex, France. The model 210 transponder circuit is a passive transponder which operates at 13 MHz and has a considerable data storage capability.

The communications element 1506 is also configured to facilitate the deactivation of the marker 1400. In this regard, the communications element 1506 is configured to selectively cause power to be supplied to and removed from the deactivation element 1510. Electric current or voltage is supplied from the energy harvesting element 1504 to the electrophoretic component 1404 when power is supplied to the deactivation element 1510. The selective supply of electric current or voltage to the electrophoretic component 1404 is performed in response to the communications element's reception of a marker deactivation signal (e.g., the marker deactivation signal transmitted from the antenna pedestals 112, 116 of FIG. 1, POS terminal 208 of FIG. 2, and/or portable read/write unit 212 of FIG. 2).

Illustrative Method for Operating a Marker

Figure 16:
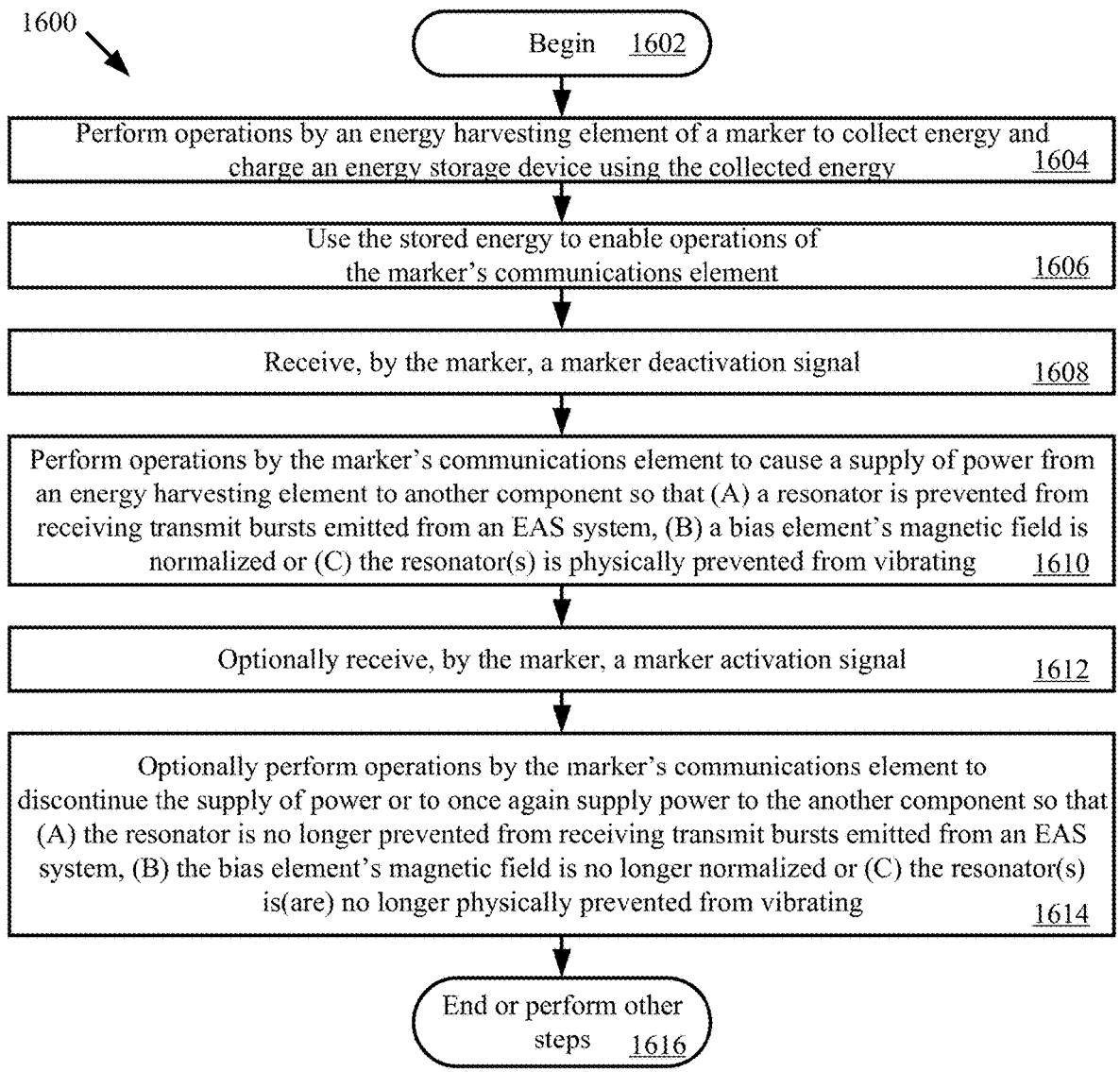
FIG. 16 is a flow diagram of an illustrative method for operating a marker.

Referring now to FIG. 16, there is provided a flow diagram of an illustrative method 1600 for operating a marker (e.g., marker 102 of FIG. 1, marker 600 of FIG. 6, marker 700 of FIG. 7, marker 900 of FIG. 9, marker 1000 of FIG. 10, marker 1200 of FIG. 12, marker 1400 of FIG. 14). Method 1600 begins with 1602 and continues with 1604 where an energy harvesting element (e.g., energy harvesting element 804 of FIG. 8, 1104 of FIG. 11, 1304 of FIG. 13, or 1504 of FIG. 15) performs operations to collect energy (e.g., RF energy and/or AM energy) and charge an energy storage device (e.g., a capacitor) using the collected energy. The stored energy is used in 1606 to enable operations of the marker's communications element (e.g., communications element 806 of FIG. 8, 1106 of FIG. 11, 1306 of FIG. 13, or 1506 of FIG. 15). In 1608, the marker receives a marker deactivation signal transmitted from an external device (e.g., antenna pedestals 112, 116 of FIG. 1, POS terminal 208 of FIG. 2, and/or portable read/write unit 212 of FIG. 2). In response to the marker deactivation signal's reception, the marker's communications element performs operations to set a status bit value to a deactivate value (e.g., "1") and/or cause power to be supplied from the energy harvesting element to another component (e.g., deactivation element 810 of FIG. 8, coil 932 of FIG. 9, shape memory alloy component 1250 of FIG. 12, or deactivation element 1510 of FIG. 15), as shown by 1610. When power is supplied, either (A) a resonator is prevented from receiving transmit bursts emitted from an EAS system, (B) a bias element's magnetic field is normalized, or (C) the resonator(s) is(are) physically prevented from vibrating.

In some cases, the marker may be a reusable marker. Thus, it may be desirable to re-activate the marker at a later time. In this case, method 1600 continues with optional 1612-1614. 1612-1614 involve: receiving, by the marker, a marker activation signal; performing operations by the marker's communications element to set a status bit value to an activate value (e.g., "0"); cause the energy harvesting element to discontinue the supply of power therefrom; and/or cause the energy harvesting element to supplying power once again therefrom. As a result, the marker is re-activated since (A) the resonator is no longer prevented from receiving transmits bursts emitted from an EAS system, (B) the bias element's magnetic field is no longer normalized, or (C) the resonator(s) is(are) no longer physically prevented from vibrating. Subsequently, 1616 is performed where method 1600 ends or other processing is performed (e.g., return to 1604).

All of the apparatus, methods, and algorithms disclosed and claimed herein can be made and executed without undue experimentation in light of the present disclosure. While the present solution has been described in terms of preferred embodiments, it will be apparent to those having ordinary skill in the art that variations may be applied to the apparatus, methods and sequence of steps of the method without departing from the concept, spirit and scope of the present solution. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the present solution as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for operating a marker, comprising:
storing energy collected by an energy harvesting element of the marker;
using the stored energy to enable operations of a communications element of the marker;
receiving, by the marker's communications element, a marker deactivation signal transmitted from an external device; and
in response to the marker deactivation signal's reception, supplying power from the energy harvesting element to a deactivation element of the marker causing a resonator to be prevented from receiving transmit bursts emitted from an Electronic Article Surveillance ("EAS") system,
the deactivation element comprising a capacitor coupled to a coil internal to the marker,
wherein the coil surrounds at least the resonator of the marker, and
wherein the resonator is prevented from receiving the transmit bursts emitted from the EAS system when the coil is shorted.

2. The method according to claim 1, further comprising:
shorting, in response to power being supplied to the deactivation element, the coil.

3. The method according to claim 1, wherein causing the resonator to be prevented from receiving the transmit bursts comprises preventing the resonator from vibrating in response to the transmit bursts.

4. The method according to claim 1, wherein the coil is not disposed around a bias element of the marker.

5. A marker, comprising:
a resonator;
a bias element;
a deactivation element comprising a capacitor coupled to a coil internal to the marker wherein the coil surrounds at least the resonator;
an energy harvesting circuit configured to collect and store energy; and
a communications element coupled to the energy harvesting circuit, and configured to:
receive a marker deactivation signal transmitted from an external device when enabled by the stored energy, and
supply a portion of the stored energy to the deactivation element and cause the resonator to be prevented from receiving transmit bursts emitted from an Electronic Article Surveillance ("EAS") system, in response to the reception of the marker deactivation signal,
wherein the deactivation element is configured to short the coil to prevent the resonator from receiving the transmit bursts emitted from the EAS system.

6. The marker according to claim 5, wherein the deactivation element is configured to short the coil in response to power being supplied to the deactivation element.

7. The marker according to claim 5, wherein causing the resonator to be prevented from receiving the transmit bursts comprises preventing the resonator from vibrating in response to the transmit bursts.

8. The marker according to claim 5, wherein the coil is not disposed around the bias element.

* * * * *